UNITED STATES PATENT OFFICE.

VALENTINE SEIB, OF ALBANY, NEW YORK.

MANUFACTURE OF POLISHING-POWDER.

SPECIFICATION forming part of Letters Patent No. 376,211, dated January 10, 1888.

Application filed March 24, 1887. Serial No. 232,249. (No specimens.)

*To all whom it may concern:*

Be it known that I, VALENTINE SEIB, a citizen of the United States, residing in the city and county of Albany, and State of New York, have invented a new and useful Method of Making a Composition of Matter to be Used for Cleaning and Polishing Wood, Metal, and the Teeth, of which the following is a specification.

My composition consists simply of coal-ashes, prepared in the following manner: Take the usual coal-ashes and reheat or reburn them, so that there shall remain no large pieces, lumps of coal, or other substances, and the result shall be nothing but the fine coal-ashes. Then place such reburned or reheated ashes in water and boil the water with said ashes for about one hour. Then place the vessel holding such ashes and water in a cool place and allow the ashes to settle. Then draw off the whole of the muddy-appearing water and again allow the same to settle. Upon such resettling the substance or powder which remains after the last resettling is removed from the water and dried, and is the substance or powder which constitutes the said composition of matter to be used for said cleaning and polishing.

This said powder may be used in cleaning and polishing either wood, metal, or the teeth.

In using the same the surface of the article to be cleaned may first be moistened and the dry powder applied by means of a dry brush, cloth, or chamois, or the composition may be applied by a moistened brush, cloth, or chamois to a dry surface, the particles of the powder after the polishing is completed, in either case, being removed by a dry brush, cloth, or chamois.

I hereby reserve the right to make an application for a patent for the herein-described powder.

What I claim, and desire to secure by Letters Patent of the United States, is—

The process of making a cleaning and polishing powder from coal-ashes by reheating and reburning such coal-ashes, afterward boiling the same in water, settling and resettling said water, removing said ashes from said water after such resettling, and drying the same, substantially as described.

VALENTINE SEIB.

Witnesses:
BURR D. BLAIR,
EDWIN G. DAY.